United States Patent [19]

Krumwiede et al.

[11] Patent Number: 5,023,210
[45] Date of Patent: Jun. 11, 1991

[54] NEUTRAL GRAY, LOW TRANSMITTANCE, NICKEL-FREE GLASS

[75] Inventors: John F. Krumwiede, Cumberland, Md.; Paul W. Kopp, Crystal City, Mo.; Robert B. Heithoff, LaVale, Md.

[73] Assignee: PPG Industries, Inc., Pittsburgh, Pa.

[21] Appl. No.: 431,052

[22] Filed: Nov. 3, 1989

[51] Int. Cl.$^5$ .............................................. C03C 3/087
[52] U.S. Cl. ...................................... 501/71; 501/904; 501/905
[58] Field of Search ......................... 501/71, 904, 905

[56] References Cited

U.S. PATENT DOCUMENTS

| | | | |
|---|---|---|---|
| Re. 25,312 | 1/1963 | Duncan et al. | 501/71 |
| 2,524,719 | 10/1950 | Tillyer | 501/71 |
| 2,892,726 | 6/1959 | Smith et al. | 501/71 |
| 3,296,004 | 1/1967 | Duncan | 501/71 |
| 3,300,323 | 1/1967 | Plumat et al. | 501/71 |
| 3,723,142 | 3/1973 | Kato et al. | 501/71 |
| 4,104,076 | 8/1978 | Pons | 501/71 |

FOREIGN PATENT DOCUMENTS 1331492 9/1973 United Kingdom .................. 501/71

Primary Examiner—Mark L. Bell
Attorney, Agent, or Firm—Dennis G. Millman

[57] ABSTRACT

A neutral gray, low transmittance (less than 20 percent luminous transmittance) soda-lime-silica glass has reduced solar energy transmittance, and in particular exceptionally low ultraviolet transmittance (less than 20 percent total solar ultraviolet transmittance) when provided with the following colorant constituents:

$Fe_2O_3$ (total iron) 0.4–0.7 percent by weight
FeO 0.08–0.15
Se 0.003–0.008
CoO 0.003–0.025
$Cr_2O_3$ 0.022–0.050

The glass avoids the use of nickel compounds as colorants. Parameters for melting such a glass in a commercial furnace are also disclosed.

11 Claims, No Drawings

NEUTRAL GRAY, LOW TRANSMITTANCE, NICKEL-FREE GLASS

BACKGROUND OF THE INVENTION

This invention relates to improvements in neutral gray colored glass of the type having low luminous (visible light) transmittance, and in particular to reductions in the ultraviolet and infrared transmittances, thereby lowering the total solar energy transmittance. The type of dark gray glass to which the present invention relates is characterized by luminous transmittance less than 20 percent at a thickness of 0.219 inches (5.56 millimeters).

In the past, gray colored heat absorbing glasses often relied on the inclusion of nickel as a chief coloring agent. But avoiding the use of nickel is desirable because the presence of nickel during melting sometimes leads to the formation of nickel sulfide stones in the glass. Although the nickel sulfide stones are nearly invisible and cause no harm to the glass under normal conditions, the high coefficient of thermal expansion of nickel sulfide can cause thermally induced stresses sufficient to fracture a glass sheet having a nickel sulfide stone. This is a particular problem in applications where the glass is subjected to a tempering process in which the presence of nickel sulfide stones can produce an unacceptably high rate of thermal breakage during or subsequent to tempering. Some prior art gray glass having nickel as a major colorant also has the disadvantage of undergoing a color shift as a result of being thermally tempered. Accordingly, it would be desirable to produce a gray glass that has the combination of low luminous transmittance (less than 20 percent) and reduced ultraviolet and infrared transmittance without the use of nickel compounds.

The following is a typical prior art dark gray glass composition, in which nickel is relied on for the gray color:

$SiO_2$ 72.90 percent by weight
$Na_2O$ 13.70
$K_2O$ 0.03
CaO 8.95
MgO 3.90
$Al_2O_3$ 0.10
$SO_3$ 0.27
$Fe_2O_3$ 0.060
CoO 0.015
NiO 0.095

The luminous transmittance (C.I.E. illuminant C) of the above glass is 14.4 percent, the total infrared transmittance is 52 percent, the ultraviolet transmittance is 70.4, and the total solar energy transmittance is 38 percent at a thickness of 0.219 inches (5.56 millimeters). Although the visible transmittance is quite low, it may be noted that the ultraviolet and infrared transmittances are disproportionately high. It would be particularly desirable to lower the ultraviolet transmittance for the sake of reducing its fading effect on fabrics and other materials in automobiles and building interiors as well its aging effect on plastics.

Another nickel-containing gray glass composition is disclosed in U.S. Reissue Pat. No. 25,312 (Duncan et al.). The transmittances of the glass of that patent are relatively high and the glass would be considered a light gray glass that is intended to absorb only a moderate amount of solar radiation.

Attempts have been made to produce nickel-free gray glass as shown in U.S. Pat. No. 3,723,142 (Kato et al.) and British patent specification No. 1,331,492 (Bamford). In both of these patents the glasses are relatively transparent and are not the type of low luminous transmittance glass to which the present invention is directed.

Another attempt at nickel-free gray glass is disclosed in U.S. Pat. No. 4,104,076 (Pons) where $Cr_2O_3$ or $UO_2$ is used in combination with CoO and Se to produce a gray color. Although broad ranges for the coloring agents are disclosed in that patent, all of the examples have colorant concentrations that are not characteristic of the dark type of glass involved here. This is confirmed by the transmittance curves shown in FIGS. 2 through 5 of that patent, where transmittances in the visible light portion of the spectrum are well above 30 percent, and above 40 percent to a substantial extent, for all of the examples illustrated. In particular, it should be noted that the upper end of the broadest $Cr_2O_3$ range disclosed is 0.0200 percent, and the largest amount of $Cr_2O_3$ actually used in any of the Pons examples is 0.0085 percent. The goal of that patent is merely to produce a glass having a total solar transmittance of less than 50 percent (col. 2, lines 5-6) at a thickness of 6.2 millimeters, whereas the objective of the present invention is to reduce the total solar energy transmittance below the typical commercial product level of 38 percent referred to above. The Pons patent shows no awareness of the desirable results that are attained when the $Cr_2O_3$ concentration exceeds those disclosed.

U.S. Pat. No. 3,300,323 (Plumat et al.) also involves an attempt to produce gray glass without nickel. Instead of nickel, this patent's approach requires the inclusion of $TiO_2$ and optionally $MnO_2$, both of which present significant drawbacks. A glass composition having substantial amounts of $TiO_2$ is not compatible with the float forming process, by which most flat glass is produced. This is because the $TiO_2$ causes a yellow color to form when the glass comes into contact with molten tin in the float process. Glass containing $MnO_2$ has a tendency to form brown coloration when exposed to ultraviolet radiation, thus making product uniformity difficult to maintain. Additionally, the plural valance states of manganese makes control of the oxidizing conditions in the glass melting operation very critical, which renders control of the color difficult in a manufacturing operation.

A nickel-free, dark gray glass containing iron, cobalt, and selenium is the subject matter of co-pending, commonly assigned U.S. Pat. application Ser. No. 215,191 filed on July 5, 1988, by James V. Jones now U.S. Pat. No. 4,873,206. The glass disclosed there does not include chrome, relying instead on a relatively high concentration of iron and control of the redox conditions during melting to drive a certain amount of the iron to the ferrous state. While this approach may permit attaining transmittance goals similar to the present invention and may yield a product suitable for some applications, producing desired neutral color characteristics can be more difficult with that approach, and in particular, the sensitivity of the color to the redox level renders it difficult to maintain consistent color characteristics in the product. Color consistency is particularly important to the architectural market where uniformity of appearance over a large area glazed with many pieces of glass is a concern.

SUMMARY OF THE INVENTION

The present invention is a glass composition having a neutral, dark gray color that is essentially nickel-free, with luminous transmittance less than 20 percent (preferably less than 16 percent), total solar ultraviolet transmittance less than 20 percent (preferably less than 15 percent, optimally less than 10 percent), total solar infrared transmittance less than 40 percent, and total solar energy transmittance less than 30 percent at a reference thickness of 0.219 inches (5.56 millimeters). The ultaviolet transmittance is exceptionally low for this type of glass. The glass of the present invention has a standard soda-lime-silica flat glass base composition and avoids constituents that cause difficulty in manufacturing such as manganese and titanium. It has been found that at low transmittances, a neutral gray glass can be produced using iron, cobalt, selenium, and chrome as the colorants in the following ranges:

| Component | Weight Percent of Total Glass | |
|---|---|---|
| | Range | Preferred Range |
| $Fe_2O_3$ (total iron) | 0.4–0.7 | 0.5–0.6 |
| FeO | 0.08–0.15 | 0.08–0.11 |
| Se | 0.003–0.008 | 0.004–0.007 |
| CoO | 0.003–0.025 | 0.010–0.020 |
| $Cr_2O_3$ | 0.022–0.050 | 0.027–0.045 |

Neutral coloration of a gray glass is marked by low excitation purity. The glass of the present invention advantageously exhibits an excitation purity less than 6 percent, and less than 4 percent in preferred embodiments. As a result, maintaining color specifications during manufacturing is simplified. The glasses of the present invention yield a relatively narrow range of dominant wavelengths in keeping with the desired neutral gray appearance ranging from 475 to 495 nanometers. This also simplifies the manufacturing process.

The absence of nickel is accommodated in the present invention primarily by the inclusion of chrome in amounts substantially higher than customary in a gray glass. Selenium and cobalt concentrations are chosen to adjust the color toward neutral. A specified amount of iron in the ferrous state helps reduce transmittance in the infrared region of the spectrum and is also believed to enhance the color by interacting with the selenium to form ferrous selenide coloration sites in the glass. Iron is a major absorber in the visible wavelengths, but the total amount of iron is kept relatively low to improve melting of the glass.

Because the glass is essentially free from nickel (some may be present as a contaminant) it can be tempered without the usual risk of breakage associated with the presence of nickel sulfide stones in gray glass. Furthermore, the glass of the present invention substantially avoids shifting color upon tempering as does dark gray glass that contains nickel as a colorant.

Another aspect of the invention involves the process of melting the novel glass composition described herein. It has been found that the redox conditions needed to cause the necessary amount of iron to be in the ferrous state can be produced in a conventional melting furnace without substantial disruption to the melting efficiency or the quality of glass produced. Reducing conditions are maintained by employing less sulfate refining aid than is customary. The presence of relatively large amounts of selenium appears to aid the refining process so that the cut in sulfate does not detrimentally affect the glass quality. Other measures may also be taken separately or in combination as will be described herein.

DETAILED DESCRIPTION

Soda-lime-silica flat glass may be essentially characterized by the following composition on a weight percentage basis of the total glass:

$SiO_2$ 68–75%
$Na_2O$ 10–18
CaO 5–15
MgO 0–5
$Al_2O_3$ 0–5
$K_2O$ 0–5

Other minor ingredients, including melting and refining aids such as $SO_3$, may also appear in the glass composition. Small amounts of BaO or $B_2O_3$ have also sometimes been included in flat glass and may be considered optional. To this base glass are added the coloring constituents of the present invention set forth above. The glass is essentially free of nickel; that is, no deliberate addition of nickel or nickel compounds is made, although the possibility of traces of nickel due to contamination may not always be avoided. Likewise, the glass is essentially free of colorants other than those specifically recited other than any trace amounts that may be present as impurities. The glass of the present invention may be melted and refined continuously in a conventional tank type melting furnace and formed into flat glass sheets of varying thicknesses by the float method in which the molten glass is supported on a pool of molten metal, usually tin, as it assumes a ribbon shape and is cooled.

The concentrations of each of the colorants depend upon the particular transmittance and color characteristics desired for a product glass, and they are interrelated to each other to a considerable extent. The selenium contributes a pink color to the glass and a brown color when complexed with iron, cobalt produces a blue color, chrome and iron contribute green, and iron also produces blue depending upon the oxidation state. Iron in the ferric state ($Fe_2O_3$) yields a yellow color, and iron in the ferrous state (FeO) produces a blue color. In the present invention 15 to 20 percent of the total iron (expressed as $Fe_2O_3$) may be in the ferrous state. Proper proportioning of the colorants in accordance with the concentration ranges of the present invention results in a color that has a desirable neutral gray appearance.

Examples 1 through 15 are all satisfactory embodiments of the present that exhibit a pleasing neutral gray appearance and provide excellent reduction of solar energy transmittance. Luminous transmittance ("$LT_s$") is less than 15 percent for all of these examples measured with C.I.E. illuminant "S" (simulated total solar light) at a reference thickness of 0.219 inches (5.56 millimeters). Luminous transmittance measured with illuminant "C" would be expected to be only slightly different, with all of the examples near or below 15 percent. The total solar ultraviolet transmittance ("TSUV") is exceptionally low in each of the examples, with none exceeding 10 percent. The total solar infrared transmittance ("TSIR") and total solar energy transmittance ("TSET") of each example are substantially lower than the prior art dark gray glass described herein, thereby resulting in a window glazing that excludes a greater portion of the sun's heat and radiation from entering a building or vehicle. It should be apparent that the same compositions can be made into products of varying thicknesses, and that the present invention is intended to encompass glass having thicknesses lower than the reference thickness with correspondingly higher transmittances. Greater thicknesses may also be made.

Providing the manufacturing conditions to yield the desired oxidation-reduction ("redox") state for the colored glass of the present invention may include taking the conventional measures of adding a carbon source (e.g., powdered coal) to the raw batch mixture and/or decreasing the air/fuel ratio of the burners in the melting furnace. Coal may be included in the batch at the rate of 0.5 to 1.5 parts by weight to 1000 parts by weight of sand. Additionally, it has been found that at the concentration levels involved in the composition of the present invention, selenium appears to partially serve the function of a refining aid, that is, it assists in removing gaseous inclusions from the melt and in producing a homogeneous molten mass. As a result, lower amounts of the usual refining aid, sodium sulfate, need be included in the batch mixture. Since sodium sulfate tends to act as an oxidizing agent in a glass melting process, its partial elimination serves to make conditions more reducing. Accordingly, the batch mixture may include 6 to 10 (preferably about 8) parts by weight sodium sulfate per 1000 parts by weight sand. Another optional measure to make the melting conditions more reducing is to use as a source of the iron and iron-containing material that includes a relatively high proportion of iron in the ferrous state. An example of such a material is "Melite 40," a product of the Calumite Company, Boca Raton, Florida, which is a $CaO-Al_2O_3-SiO_2$ slag containing about 20 percent by weight total iron, with about 80 percent of the iron in the form of FeO. This material may wholly or partially replace the usual ferric oxide source of iron in the batch mixture. Yet another optional operational adjustment that can be made to yield a slightly more reduced glass is to increase the temperature at the downstream end of the melting furnace, whereby thermal reduction tends to drive more of the iron in the glass toward the ferrous state.

The base glass composition for Example 13, which is essentially the same for all of the examples, is as follows:

| Component | Weight Percent of Total Glass |
| --- | --- |
| $SiO_2$ | 72.09 |
| $Na_2O$ | 13.90 |
| CaO | 8.91 |
| MgO | 3.92 |
| $SO_3$ | 0.23 |
| $Al_2O_3$ | 0.09 |
| $K_2O$ | 0.04 |

The batch mixture for Example 13, which is likewise similar for all of the examples, was:

| Constituent | Parts by Weight |
| --- | --- |
| Sand | 1000.00 |
| Soda ash | 302.90 |
| Sodium sulfate | 8.53 |
| Limestone | 83.67 |
| Dolomite | 242.89 |
| Sodium nitrate | 27.72 |
| Rouge | 8.33 |
| Chromite | 1.32 |
| Selenium | 0.626 |
| $Co_3O_4$ | 0.458 |

The chrome source was an iron chromite product known as Chromox which has a chemical analysis of 47 percent $Cr_2O_3$, 20 percent FeO, 15 percent $Al_2O_3$, and 1.5 percent $SiO_2$ (all percents by weight).

It is an advantage of the present invention that the composition can be manufactured into flat glass products using commercial processes, in particular the float process. A sheet of glass that has been formed by the float process is characterized by measurable amounts of tin oxide that migrated into surface portions of the glass on at least one side during the forming process. Typically a sheet of float glass has an $SnO_2$ concentration of at least 0.05 percent by weight in the first few microns below the surface that was in contact with the molten tin. Other deliberate modifications of the surface portion of glass during or after forming are known. These include migrating ions into the surface of the glass to modify the color of the glass or to strengthen the glass. It should be understood that the compositions given herein relate to the bulk glass composition, that is, the vast majority of the interior volume of a glass product, and do not preclude the possibility of compositional variations of this type at minor surface portions.

Another characteristic of most mass-produced glass is the presence of traces of melting and refining aids such as sulfur compounds, fluorine, or chlorine. Small amounts of these melting and refining aids (usually less that 0.3 percent by weight) may be present in the glass compositions of the present invention without effecting the properties of the product glass.

Glass made by the float process typically ranges in thickness from about 2 to 10 millimeters in thickness. For the preferred solar radiation control features of the present invention, it is preferred that the transmittance properties described herein be attained within the thickness range of 3 to 6 millimeters.

Other variations as are known to those of skill in the art may be resorted to without departing form the scope of the invention as defined by the claims that follow.

TABLE I

| | EXAMPLE: | | | | | | |
| --- | --- | --- | --- | --- | --- | --- | --- |
| | 1 | 2 | 3 | 4 | 5 | 6 | 7 |
| $SO_3$ | 0.2255 | 0.225 | 0.2285 | 0.2335 | 0.2295 | 0.234 | 0.231 |
| Total Iron | 0.5775 | 0.5715 | 0.5765 | 0.58 | 0.579 | 0.5795 | 0.58 |
| Iron Redox | 0.1662 | 0.1715 | 0.1735 | 0.1724 | 0.1658 | 0.1639 | 0.1647 |
| FeO | 0.096 | 0.098 | 0.1 | 0.1 | 0.096 | 0.095 | 0.0955 |
| CoO | 0.018 | 0.0175 | 0.0170 | 0.0175 | 0.018 | 0.018 | 0.018 |
| Se | 0.00665 | 0.00655 | 0.00615 | 0.0057 | 0.006 | 0.00585 | 0.00575 |
| NiO | 0.0008 | 0.0008 | 0.00055 | 0.00065 | 0.0001 | 0.0001 | 0.0001 |
| $Cr_2O_3$ | 0.029 | 0.029 | 0.0295 | 0.0305 | 0.039 | 0.0405 | 0.0405 |
| $LT_s$ | 13.5 | 13.8 | 14.0 | 13.9 | 13.9 | 13.6 | 13.8 |
| TSUV | 7.4 | 7.4 | 8.1 | 7.9 | 8.7 | 8.7 | 9.1 |
| TSIR | 35.4 | 34.9 | 34.6 | 34.3 | 35.7 | 35.6 | 35.4 |
| TSET | 25.9 | 25.7 | 25.7 | 25.6 | 26.3 | 26.0 | 26.1 |
| DW | 479.03 | 480.14 | 486.70 | 481.66 | 490.44 | 489.00 | 489.54 |

TABLE I-continued

| Pe | 1.43 | 0.62 | 1.03 | 1.86 | 3.04 | 3.69 | 3.84 |
|---|---|---|---|---|---|---|---|

| EXAMPLE: | | | | | | | |
|---|---|---|---|---|---|---|---|
| | 8 | 9 | 10 | 11 | 12 | 13 | 14 | 15 |
| $SO_3$ | 0.233 | 0.237 | 0.2345 | 0.229 | 0.233 | 0.227 | 0.229 | 0.235 |
| Total Iron | 0.5765 | 0.579 | 0.58 | 0.5775 | 0.5775 | 0.577 | 0.5775 | 0.578 |
| Iron Redox | 0.1648 | 0.1641 | 0.1629 | 0.1636 | 0.1636 | 0.1638 | 0.1654 | 0.1644 |
| FeO | 0.095 | 0.095 | 0.0945 | 0.0945 | 0.0945 | 0.0945 | 0.0955 | 0.095 |
| CoO | 0.018 | 0.018 | 0.018 | 0.017 | 0.018 | 0.0175 | 0.017 | 0.018 |
| Se | 0.00555 | 0.00555 | 0.0057 | 0.0056 | 0.0059 | 0.00545 | 0.0057 | 0.0058 |
| NiO | 0.0001 | 0.0001 | 0.0001 | 0.0001 | 0.0001 | 0.0001 | 0.0001 | 0.0001 |
| $Cr_2O_3$ | 0.0405 | 0.042 | 0.042 | 0.0375 | 0.0395 | 0.0375 | 0.037 | 0.036 |
| $LT_s$ | 13.8 | 13.8 | 14.0 | 14.2 | 14.8 | 14.9 | 14.8 | 14.4 |
| TSUV | 9.2 | 9.1 | 9.0 | 9.3 | 9.0 | 9.2 | 9.1 | 8.8 |
| TSIR | 35.6 | 35.7 | 36.1 | 36.1 | 36.3 | 36.0 | 36.0 | 36.0 |
| TSET | 26.2 | 26.2 | 26.3 | 26.5 | 26.9 | 26.7 | 26.7 | 26.6 |
| DW | 487.88 | 488.00 | 486.43 | 487.39 | 487.90 | 488.70 | 488.09 | 486.72 |
| Pe | 4.51 | 4.68 | 4.92 | 4.51 | 3.93 | 3.21 | 3.14 | 3.85 |

We claim:

1. A neutral gray colored glass composition having a base glass composition comprising:

$SiO_2$ 68–75 percent by weight
$Na_2O$ 10–18
CaO 5–15
MgO 0–5
$Al_2O_3$ 0–5
$K_2O$ 0–5 and traces of melting and refining aids, if any, and colorants consisting essentially of:

$Fe_2O_3$ (total iron) 0.4–0.7 percent by weight
FeO 0.08–0.15
Se 0.003–0.008
CoO 0.003–0.025
$Cr_2O_3$ 0.022–0.050 the glass having a luminous transmittance less than 20 percent and total solar ultraviolet transmittance less than 20 percent at a thickness of 0.219 inch (5.56 millimeters).

2. The composition of claim 1 wherein the colorant portion consists essentially of:

$Fe_2O_3$ (total iron) 0.5–0.6
FeO 0.08–0.11
Se 0.004–0.007
CoO 0.010–0.020
$Cr_2O_3$ 0.027–0.045.

3. The composition of claim 1 wherein the glass at a thickness of 0.219 inch (5.56 millimeters) has total solar ultraviolet transmittance less than 10 percent.

4. The composition of claim 1 wherein the glass at a thickness of 0.219 inch (5.56 millimeters) has total solar ultraviolet transmittance less than 15 percent.

5. An article of manufacture comprising a glass sheet having a base glass composition comprising:

$SiO_2$ 68–75 percent by weight
$Na_2O$ 10–18
CaO 5–15
MgO 0–5
$Al_2O_3$ 0–5
$K_2O$ 0–5 and traces of melting and refining aids, if any, and colorants consisting essentially of:

$Fe_2O_3$ (total iron) 0.4–0.7 percent by weight
FeO 0.08–0.15
Se 0.003–0.008
CoO 0.003–0.025
$Cr_2O_3$ 0.022–0.050 the glass having a luminous transmittance less than 20 percent and total solar ultraviolet transmittance less than 20 percent at a thickness of 0.219 inch (5.56 millimeters).

6. The glass sheet of claim 5 wherein the colorant portion of the glass sheet consists of:

$Fe_2O_3$ (total iron) 0.5–0.6
FeO 0.08–0.11
Se 0.004–0.007
CoO 0.010–0.020
$Cr_2O_3$ 0.027–0.045.

7. The glass sheet of claim 5 having a thickness of 2 to 10 millimeters.

8. The glass sheet of claim 5 having a thickness of 3 to 6 millimeters.

9. The glass sheet of claim 5 wherein the total solar ultraviolet transmittance is less than 15 percent.

10. The glass sheet of claim 5 wherein the total solar ultraviolet transmittance is less than 15 percent.

11. A method of making low transmittance soda-lime-silica glass comprising: melting a batch mixture proportioned to yield a soda-lime-silica glass having at least 0.4 percent by weight total iron measured as $Fe_2O_3$ including at least 0.08 weight percent FeO, at least 0.022 percent by weight $Cr_2O_3$, at least 0.003 weight percent CoO, and at least 0.003 percent Se; limiting the amount of sulfur-containing refining aid included in the batch mixture to an amount equivalent to no more than 10 parts by weight sodium sulfate per 1000 parts by weight of sand in the batch mixture; and including in the batch mixture a carbon source equivalent to at least 0.5 parts by weight coal per 1000 parts by weight sand in the batch mixture, whereby the glass has luminous transmittance less than 20 percent and total solar ultraviolet transmittance less than 20 percent at a thickness of 0.219 inch (5.56 millimeters).

* * * * *

UNITED STATES PATENT AND TRADEMARK OFFICE
CERTIFICATE OF CORRECTION

PATENT NO. : 5,023,210

DATED : June 11, 1991

INVENTOR(S) : John F. Krumwiede, Paul W. Kopp, Robert B. Heithoff

It is certified that error appears in the above-identified patent and that said Letters Patent is hereby corrected as shown below:

Claim 10, column 8, line 44, "15" should be "10".

Signed and Sealed this

Thirteenth Day of October, 1992

*Attest:*

DOUGLAS B. COMER

*Attesting Officer*      Acting Commissioner of Patents and Trademarks